United States Patent [19]

Nomura et al.

[11] Patent Number: 4,559,103

[45] Date of Patent: Dec. 17, 1985

[54] PACKAGING PAPER AND PACKAGING MATERIAL FOR PACKAGING METALLIC MATERIAL AND METHOD OF PRODUCING THE SAME

[75] Inventors: Yoshika Nomura, Ichikawa; Susumu Sano; Sadahiro Shoji, both of Tokyo, all of Japan

[73] Assignee: Honshu Seishi Kabushiki Kaisha, Tokyo, Japan

[21] Appl. No.: 518,297

[22] Filed: Jul. 28, 1983

[30] Foreign Application Priority Data

| Aug. 5, 1982 | [JP] | Japan | 57-135675 |
| Aug. 5, 1982 | [JP] | Japan | 57-135676 |
| Aug. 6, 1982 | [JP] | Japan | 57-136239 |
| Aug. 16, 1982 | [JP] | Japan | 57-141079 |
| Mar. 17, 1983 | [JP] | Japan | 58-45132 |

[51] Int. Cl.$^4$ .................................................. D21H 5/22
[52] U.S. Cl. ..................... 162/160; 162/161; 422/8
[58] Field of Search .................. 162/160, 161; 422/8

[56] References Cited

U.S. PATENT DOCUMENTS

| 2,033,452 | 3/1936 | Schierholtz | 162/160 |
| 2,643,177 | 6/1953 | Wachter et al. | 422/8 |
| 2,707,551 | 5/1955 | Shnitzler et al. | 422/8 |
| 2,822,236 | 2/1958 | Sheldon et al. | 162/160 |
| 3,041,234 | 6/1962 | Taylor | 422/8 |
| 3,425,954 | 2/1969 | Ruzevick et al. | 422/8 |
| 3,433,577 | 3/1969 | Shick | 422/8 |
| 3,936,560 | 2/1976 | Santurri et al. | 422/8 |
| 4,374,174 | 2/1983 | Stricklin et al. | 422/8 |

FOREIGN PATENT DOCUMENTS

| 511267 | 3/1955 | Canada | 422/8 |
| 578661 | 6/1959 | Canada | 422/8 |
| 2112997 | 9/1972 | Fed. Rep. of Germany | 162/160 |
| 47601 | 8/1974 | Japan . | |
| 98988 | 4/1980 | Japan . | |
| 728634 | 4/1955 | United Kingdom | 422/8 |
| 1103399 | 2/1968 | United Kingdom | 162/160 |

OTHER PUBLICATIONS

Casey, *Pulp & Paper*, vol. I, II, III (1960) pp. 100, 101, 112, 544, 1013, 1435, 1436, 1461.

Rowe et al., "Investigation of Antitarnish Paper", paper presented at Annual Meeting of the TAPPI, New York, N.Y., Feb. 20-23, 1939.

*Primary Examiner*—Peter Chin
*Attorney, Agent, or Firm*—Armstrong, Nikaido, Marmelstein & Kubovcik

[57] ABSTRACT

Disclosed is a method of producing a packaging paper for packaging metallic materials, as well as a packaging material such as corrugated box produced from the packaging paper, the method comprising at least one of the steps of (i) pulping a material by a cooking liquor containing no sulfur compound, or pulping the material by a cooking liquor containing a sulfur compound and then oxidizing the pulp with a peroxide, (ii) conducting the paper making step in the neutral region of pH value ranging between 6 and 8, and (iii) applying a rust-prevention agent and/or a sterilizer to the paper sheet. Disclosed also are a packaging paper and packaging material for packaging metallic materials, produced by the above-mentioned method.

6 Claims, No Drawings

PACKAGING PAPER AND PACKAGING MATERIAL FOR PACKAGING METALLIC MATERIAL AND METHOD OF PRODUCING THE SAME

BACKGROUND OF THE INVENTION

Nowadays, paper and paperboard find various uses as packaging materials, among which kraft packaging paper and linerboard are used most commonly. Hitherto, kraft packaging paper and linerboard have been made mainly from kraft pulp or waste paper containing kraft pulp. Kraft pulp is a pulp which is produced by digesting wood materials by means of a kraft digesting chemical containing sodium sulfide, so that sulfur compounds such as sulfides and thiolignin inevitably remain in the kraft pulp.

On the other hand, the corrugate medium is made by regenerating waste corrugated box or from a pulp which is obtained by digesting wood materials by a sulfite such as sodium sulfite, so that large amounts of sulfite and lignin sulfonate remain in the paper. These sulfur compounds undesirably promote corrosion or rusting of metals, particularly iron.

In making paper from the thus obtained pulp, various strenghthening agents and sizing agents are added to improve the strength and to adjust the workability of the paper. Usually, aluminum sulfate is used for fixing these additives to the pulp. Namely, the paper is made in an acidic state of pH value ranging between 4 and 5.5 obtained by adding aluminum sulfate to the pulp slurry. Thus, this known method is referred to also as "acidic paper making process" and the paper thus produced exhibits acidic pH values.

Therefore, when a metallic material is packaged in kraft packaging paper or corrugated box produced by the acidic paper making process from a pulp obtained by digesting raw material by means of a digesting solution containing sulfur compounds, the metallic material is undesirably rusted or corroded due to contact with the paper or paperboard, so that the appearance and the function of the packaged metallic material deteriorate to the point of seriously degrading the commercial value of the same.

As explained heretofore, there are many factors which cause corrosion of a metallic material. It has also been shown that the rusting of metallic materials is promoted by bacteria or microorganisms which grow on the packaging paper when the same is placed for a long time under a high humidity. The bacteria tend to appear and grow particularly when the adhesive used in the production of a corrugated board is of the starch type, such as the Steinhall starch paste or the starch paste produced by mixing a high amylose starch and a wet strength agent.

It is often experienced that microorganisms breed on paper produced from a pulp prepared from a material containing waste paper. The breeding of the microorganisms or putrefaction causes a reduction in the pH value of the paper and, in addition, the organic matters are decomposed by the enzymes produced by the microorganisms to generate $CO_2$, $NH_3$, $H_2S$ and $H_2SO_4$ to form a so-called corrosive environment. In some cases, a shortage of hydrogen is caused by the presence of anaerobic bacteria so that a part of the packaged material constitutes a cathode which undesirably promotes the corrosion. Similarly, a shortage of oxygen tends to be caused by the presence of aerobic bacteria so that a part of the packaged material serves as an anode to accelerate the corrosion unfavourably.

Hitherto, various countermeasures have been taken for preventing rusting of the packaged material. For instance, it is known to apply a vapor phase inhibitor on the paper. This countermeasure, however, cannot prevent rusting satisfactorily particularly when the metallic material together with the packaging material is placed for a long time under a high humidity.

Under these circumstances, there is an increasing demand for the development of packaging paper for metallic material, improved to satisfactorily prevent rusting of the packaged article even when the same is held for a long time under high humidity.

On the other hand, sulfur-free pulping methods have been proposed. For instance, Japanese Patent Laid-Open No. 47601/1974 discloses a method in which the material is processed by sodium hydroxide and sodium carbonate, while Japanese Patent Laid-Open No. 98988/1980 discloses a method in which wooden fibrous material is processed by a process similar to that shown in Laid-Open No. 47601/1974 to become reverse-flow type pulp. These methods, however, are aimed at preventing pollution or preventing coloring of the paper. Namely, these prior art references do not show nor suggest any metallic material packaging paper or material to which this invention pertains, improved to prevent rusting of the content, i.e. the packaged metallic materials.

Paper making in non-acidic or neutral condition is also known per se. However, such known neutral paper making process has been developed with the goal of preventing color degradation of the paper, particularly paper for printing, and is not intended for use in the manufacture of packaging papers for packaging metallic materials.

SUMMARY OF THE INVENTION

According to one aspect of the invention, there is provided a method of producing a packaging paper for packaging metallic materials, comprising the steps of: preparing sulfur-free pulp by pulping a lignocellulose material by a digesting solution which does not contain any sulfur compound; and making a paper from the thus prepared sulfur-free pulp.

According to another aspect of the invention, there is provided a method of producing a packaging paper for packaging metallic materials, comprising applying the salt of an organic or inorganic acid having a rust prevention effect.

According to still another aspect of the invention, there is provided a method of producing a packaging paper for packaging metallic materials, wherein the paper is made from a pulp slurry the pH value of which is maintained in range between 6 and 8.

According to a further aspect of the invention, there is provided a method of producing a packaging paper for packaging metallic materials, comprising the steps of: pulping a lignocellulose material by a digesting solution containing a sulfur compound; oxidizing the pulp by a peroxide; and making the paper from the oxidized pulp.

According to a still further aspect of the invention, there is provided a method of producing a packaging material for packaging metallic materials, wherein a sterilizer is added to a paper or an adhesive.

DETAILED DESCRIPTION OF THE PREFERRED EMBODIMENTS

The invention is concerned with a packaging paper and a packaging material such as a corrugated box suitable for use in packing metallic materials, as well as with a method of producing such packaging paper and material.

According to the method of the invention, a lignocellulose material is pulped by a digesting solution which may or may not contain a sulfur compound.

Examples of digesting solutions which do not contain sulfur compound are caustic soda, sodium carbonate and a mixture of caustic soda and sodium carbonate. In some cases, a digesting aid of a guinone system, alone or in combination with a penetration aid, is added to these digesting solutions. Although not exclusively, anthraquinone, 1,4-dihydro-9,10-dihydroxy anthracene and anthrahydroquinone can be used as the digesting aid of the quinone system. The rate of addition of the digesting aid preferably ranges between 0.02 and 0.2% of the oven-dry chip. Non-limiting examples of the penetration aid are copolymers of polyethylene oxide, polypropylene oxide, polyethylene oxide polymer, polyoxyethylene tristylphenylether sulfate and so forth. The optimum ratio of addition of such penetration aid is 10 to 20% by weight to the weight of the digesting aid.

On the other hand, examples of digesting solutions containing sulfur compound are the digesting solutions which are used in paper making processes ordinarily practiced in the respective field of the industry, e.g. kraft digesting process, acidic sulfite process, neutral sulfite process, alkaline sulfite process and so forth. A digesting aid of the quinone system as mentioned before and/or an penetration aid of the type mentioned before may be added as required to these known solutions.

According to the invention, the pulping is conducted employing one of the digesting solutions mentioned above and a known pulping method.

For instance, in the case of a process called soda process in which a digesting solution containing no sulfur compound is used, NaOH and 1,4-dihydro-9,10-dihydroxyanthracene are added in ratios of 15 to 22% and 0.02 to 0.1%, respectively, to the wood chips, and digesting is conducted for 1 to 3 hours at 140° to 180° C. (Note that the digesting condition varies largely depending on whether the wood chip is of conifer or broadleaf tree and whether the product is for bleaching or non-bleaching.) For instance, in the case of a process called "kraft method" in which a digesting solution containing sulfur is used, the digesting is conducted usually for 1 to 3 hours at 140° to 180° under a condition of activated alkali of 12 to 20% and a sulfur content of 20 to 30%.

When the digesting solution used contains a sulfur compound, the thus obtained pulp is supplied with a peroxide so as to oxidize the pulp components exhibiting highest rusting effect, e.g. sulfide, sulfite, thiolignin and lignin sulfonic acid, to compounds of smaller rusting power.

Any type of peroxide meeting the above-explained demand can be used in the oxidizing step of the method of the invention. Examples of peroxide preferably used are aqueous solutions of hydrogen peroxide, sodium peroxide, acetic peracid and a reaction liquid consisting mainly of acetic peroxide produced beforehand by mixing hydrogen peroxide and acetic anhydride.

The oxidizing oxidizing of the pulp is conducted by adding a peroxide at a ratio of 0.01 to 2%, preferably 0.1 to 1%, to the pulp and allowing a reaction at 10° to 70° C., preferably 30° to 50° C., for 10 to 180 minutes, preferably 30 to 120 minutes.

In the method of the invention, only peroxides are usable as the oxidizer. The use of other types of oxidizer, e.g. hydrochlorite or chlorine dioxide which are used normally, is prohibited because such oxidizers undesirably promote the rusting of the packaged material.

According to the invention, the thus obtained pulp or other ordinary pulp is made into paper through washing, refining and heating steps, all of which are conducted in known manners.

The paper making step can be conducted in an acidic condition of pH value of 4 to 5.5 by adding aluminum sulfate to the pulp slurry. Preferably, however, paper making is conducted in a neutral state in which the pH value is maintained in a range between 6 and 8.

Paper making in an alkaline state of pH value exceeding 9 is not preferred for the manufacture of anti-rust packaging paper due to the following reasons. Namely, paper making at such a high pH value causes various problems peculiar to paper making technique such as a reduction in the water drainage ratio, attaching of the wet paper to the press, frequent occurrence of pitch trouble and so forth. In addition, if a metallic material, particularly an aluminum product, is packaged by the paper made at such a high pH value, sodium aluminate is produced, causing an undesirable corrosion elution of the product. The use of paper made at such high pH value, therefore, is not suitable for use in packaging metallic materials.

In most cases, the paper strengthening agent, sizing agent and so forth are added to the paper material in the course of the manufacture of paper, as chemicals for adjusting the paper material. According to the invention, when the paper making is conducted in an acidic state, the chemicals conventionally used can be directly used as in the conventional paper making process. In contrast, when the paper making is conducted in the neutral state, it is not permissible to use aluminum sulfate, and the paper strenghthening agent and the sizing agents are required to have self-fixing properties.

Namely, paper strengthening agents having self-fixing properties, such as Mannich, Hoffmann-denatured polyacrylamide, polyamide polyamine, cation-denaturated starch and so forth, should be used as the paper strengthening agent when the method of the invention is carried out in the neutral state. As to the sizing agent having self-fixing properties, it is possible to use alkyl ketene dimer, alkenyl succinic anhydride, rosin higher fatty acid polyamine, petroleum resin maleic polyamine and so forth. The paper strengthening agent is added preferably at a ratio of 0.02 to 0.5% to the oven-dry pulp, while the ratio of the sizing agent preferably ranges between 0.1 and 0.5% of the oven-dry pulp.

The invention does not impose any restriction on the kind of the pulp used. For instance, it is possible to use a pulp obtained through digesting by known methods such as the kraft process, sulfite process, soda process, sodium carbonate process and so forth, as well as a pulp prepared from waste paper. As long as the pH value of the pulp slurry is maintained within a neutral region between 6 and 8, the paper produced by the method of the invention can prevent rusting more effectively than papers which are made in an acidic condition. Among these pulps, the pulps used most preferably are those prepared by using a digesting solution containing no sulfur, as in the cases of the soda process and the sodium carbonate process.

According to the invention, it is preferred that chemicals having a rust prevention effect (referred to as "inhibitor", hereinunder) consisting of a salt of an organic or inorganic acid and/or a sterilizer be applied to the paper produced by the described method of the invention or to an ordinary paper.

Examples of the inhibitor are sodium salt, potassium salt and ammonium salt of benzoic acid, nitrous acid and phosphoric acid, among which the sodium salt can be used most preferably.

The inhibitor is applied to the paper solely or together with starch or polyvinyl alcohol (PVA) or even in combination with a sterilizer, thereby to produce a rust prevention effect.

Examples of the sterilizer are benzoic acid and its salt, salicylic acid and its salt, sorbic acid and its salt, dehydroacetic acid and its salt, alkylester of p-oxybenzoic acid, propionic acid and its salt and so forth. It is to be noted that the benzoic acid and its salt produce both the rust prevention effect and the sterilizing effect. Among compounds usable as the sterilizer, those containing no sulfur atom or halogen atom are used more preferably. Particularly, the dehydroacetic acid, alkylester of p-oxybenzonic acid, sorbic acid and its alkali salt are used most preferably.

According to the invention, the paper to which the inhibitor and/or the sterilizer is applied may be a paper or a paperboard ordinarily used for packaging. From the point of view of enhancement of the rust prevention effect, the effect of the invention will be multiplied when the application of the inhibitor and/or the sterilizer is made to a paper which is already coated with a vapor phase inhibitor such as dicyclohexyl ammonium nitrite, paper manufactured by the neutral paper making method mentioned before, or a paper manufactured from a pulp digested by a digesting solution consisting solely of chemicals containing no sulfur.

The inhibitor and/or the sterilizer may be used alone or in combination, in the form of a solution in a soluble salt solvent such as caustic soda or, when necessitated or depending on the physical properties of the inhibitor and the sterilizer, in the form of an emulsion.

According to the invention, it is possible to use the inhibitor and the sterilizer as a mixture with normally used processing chemicals such as a surface strength agent, e.g. starch, polyvinyl alcohol and so forth. The surface strength improvement agent can be used at a rate of 0.5 to 3 g per unit area ($m^2$) of the paper surface.

The inhibitor and/or the sterilizer used in the invention may be applied in various steps in the paper making process by various known application methods. For instance, the inhibitor and the sterilizer may be applied by spray or impregnation, or may be applied by means of a size press, gate roll coater, water doctor of machine calender and so forth.

The rate of application of the sterilizer may be varied over a wide range, depending on the kind of the sterilizer. Usually, however, the ratio of the sterilizer content ranges between about 0.01 and 3%, preferably between about 0.02 and 1%, by weight to the paper. The ratio of addition of the inhibitor may also be varied widely depending on the kind of the inhibitor, although it usually ranges between 0.1 and 20 g per unit area ($m^2$) of the paper surface.

As explained already, the present invention does not impose any restriction on the type of packaging paper for packaging metallic materials, nor on the use or application of the product. Namely, the packaging paper of the invention includes all types of packaging papers such as liners for corrugated box, corrugate medium, ordinary white folding carton, cardboard for carton, ordinary packaging paper sheet and other papers and paperboard which are usable in packaging metallic materials.

These packaging materials for packaging metallic materials can be formed into sacks, cartons (cases), boxes and other containers by bonding and other suitable techniques.

Fungi are liable to grow when the adhesive used is a steinhall type starch paste, water-resistance starch paste produced by mixing a high amylose starch and an antihydration agent, or an adhesive of a three-component system containing vinyl acetate, PVA and a filler. The fungi naturally promote the corrosion of metallic materials unfavourably. The advantage of the packaging paper of the invention coated with a sterilizer, therefore, is maximized when the packaging paper is used together with an adhesive of the type mentioned above. Preferably, the sterilizer used in the invention is added directly to the adhesive to be used. Thus, packaging materials such as an adhesive, an adhesion tape or the like, containing a sterilizer or an inhibitor, are also covered by the scope of the invention.

As will be understood from the foregoing description, the metallic materials packaged by the packaging paper or the packaging material of the invention exhibits a much reduced tendency to rust when the same are placed for a long time under a high humidity, as compared with the case where the same materials are packaged by a conventional packaging paper or container. In addition, the method of the invention is much easier to carry out than the conventional methods. It will be realized that the invention offers an inestimable advantage in the field of the industry concerned.

The invention will be more fully understood from the following description of the preferred embodiments which are only illustrative and not exclusive.

EXAMPLE 1

Softwood chip was packed in 4-liter autoclave. The weight of the chips was 600 g in oven-dry state. The chip weight will be expressed hereinunder in terms of oven-dry weight. The chips were then digested by the soda process with the addition of quinone. More specifically, the digesting was conducted at 170° C. for 2 hours, with the addition of 18% of caustic soda and 0.05% of 1,4-dihydro-9,10-dihydroxyanthracene. The amounts of the additives contained will be expressed in terms of wt.% to the oven-dry weight of the chips. As a result, a pulp having a kappa value of 51 was obtained. The thus obtained pulp was beaten to a freeness of 500 ml, and, after addition of 0.3% of alkyl ketene dimer and 0.6% of cation starch (wt.% to pulp weight), a hand-made paper of 80 g/$m^2$ was produced. This paper showed a pH value of 6.8.

EXAMPLE 2

A hand-made paper sheet of 80 g/$m^2$ was made at pH 5.0 by adding 0.3% of rosin size, 0.5% of polyacrylamide and 2.5% of aluminum sulfate to the quinone soda pulp as obtained in Example 1.

REFERENCE EXAMPLE 1

On the other hand, a hand-made paper sheet of 80 g/m² was produced as Reference Example 1 by the following process. 600 g of softwood chip was cooked for 2 hours at 170° C. by a kraft cooking liquor having 18% of active alkali and a sulfur content of 25%, to become a pulp having a kappa value of 50. The pulp was then beaten to a freeness of 500 ml and was hand-made into the above-mentioned sheet by the addition of 0.3% of rosin size, 0.5% of polyacrylamide and 2.5% of aluminum sulfate.

An anti-rust test was conducted with the paper sheets of Examples 1 and 2 and Reference Example 1, by the method explained hereinunder. The same anti-rust test was conducted also for other Embodiments and Reference Examples which will be mentioned later.

Namely, square test pieces having a side length of 5 cm were cut from an SPCC iron plate. The test pieces were sandwiched by two sheets of the paper tested and were held for 48 hours at 35° C. and 90% RH. Then, the ratio of the rusting area to the whole area was examined for each of the test pieces. The results are shown in Table 1 below.

TABLE 1

|  | Example 1 | Example 2 | Ref. Example 1 |
| --- | --- | --- | --- |
| pulping method | quinone soda | quinone-soda | Kraft |
| paper-making method | neutral | acidic | acidic |
| rusting area (%) | 3 | 7 | 30 |

EXAMPLE 3

As Example 3, a hand-made paper sheet of 150 g/m² was produced at pH 7 by a process comprising the steps of beating the pulp obtained in Embodiment 1 to a freeness of 450 ml and adding 0.2% of petroleum resin cation size and 0.3% of polyamide polyamine cation polymer. Then, starch and sodium nitrite were applied by a Meyer bar to the surface of the sheet at rates of 0.5 g/m² and 0.3 g/m², respectively, and the thus coated paper sheet was subjected to the anti-rust test.

EXAMPLE 4

As Example 4, a hand-made paper sheet of 150 g/m² was made at pH 4.5, by beating the pulp obtained in Example 1 to a freeness of 450 ml and then adding 0.2% of rosin size, 0.3% of polyacrylamide and 3.5% of aluminum sulfate. Then, starch and sodium nitrite were applied to the surface of the paper sheet at rates of 0.5 g/m² and 0.3 g/m², respectively. The thus coated paper sheet was subjected to the anti-rust test.

REFERENCE EXAMPLE 2

On the other hand, a hand-made sheet as Reference Example 2 was made by the same procedure as in Reference Example 1, except that the weight was increased to 150 g/m². This sheet was subjected to the anti-rust test. The results of the anti-rust test with Examples 3 and 4 and Reference Example 2 is shown in Table 2 below.

TABLE 2

|  | Example 3 | Example 4 | Ref. Example 2 |
| --- | --- | --- | --- |
| pulping method | quinone-soda | quinone-soda | kraft |
| paper-making method | neutral | acidic | acidic |
| surface coating | starch sodium nitrite | starch sodium nitrite | — |
| rusting area (%) | 1 | 3 | 32 |

EXAMPLE 5

The hand-made sheet of Example 5 was prepared by the following process. 700 g of hardwood chip was packed in a 4-liter autoclave. With the addition of 12% of caustic soda and 4% of sodium carbonate, the chips were digested for 30 minutes at 170° C. The chips were then refined by a disc refiner to obtain a pulp in a 72% yield. The pulp was then beaten by a refiner to a freeness of 450 ml. Then, 0.3% of alkenyl succinic anhydride and 0.5% of cation starch were added to obtain a state of pH 7, and the hand-made paper sheet was made from this pulp. Then, PVA and sodium benzoate were applied to the surface of the thus produced paper sheet, at rates of 0.3 g/m² and 0.2 g/m², respectively.

EXAMPLE 6

Meanwhile, a hand-made paper sheet of 150 g/m² was manufactured at pH 4.9, by heating the pulp of Example 5 to a freeness of 450 ml and adding 0.3% of rosin size, 0.5% of polyacryl amide and 3.5% of aluminum sulfate. Then, the same rust prevention agents as those used in Embodiment 5 were applied to the surface of the thus formed paper sheet to complete the paper sheet of Example 6.

REFERENCE EXAMPLE 3

On the other hand, a paper sheet was formed as in Reference Example 3 by the process shown below. 700 g of hardwood chip, with the addition of 13% of sodium sulfite and 3% of sodium carbonate, were digested at 180° C. for 40 minutes to give a pulp in a 75% yield. The pulp was then beaten to a freeness of 450 ml and the pH value was adjusted to 4.5 by addition of 0.3% of rosin size, 0.5% of polyacrylamide and 3.5% of aluminum sulfate. A paper sheet of 150 g/m² was made as Reference Example 3 from this pulp.

The paper sheets of Examples 5 and 6 were subjected to the anti-rust test together with the paper sheet of Reference Example 3, the result of which is shown in Table 3 below.

TABLE 3

|  | Example 5 | Example 6 | Ref. Example 3 |
| --- | --- | --- | --- |
| pulping method | caustic soda sodium carbonate | caustic soda sodium carbonate | neutral sulfite |
| paper-making method | neutral | acidic | acidic |
| surface coating | PVA sodium benzoate | PVA sodium benzoate | — |
| rusting area | 2 | 3 | 47 |

EXAMPLE 7

700 g of hardwood chip was packed in a 4-liter autoclave and cooked for 20 minutes at 180° C. with the addition of 12% of sodium carbonate. The digested chips were then refined by a disc refiner to give a pulp in a 78% yield. The refined pulp was further beaten by a refiner to a freeness of 450 ml. Then, with the addition of 0.2% of petroleum resin cation size, a hand-made paper sheet of 125 g/m² was made at pH 7.2.

REFERENCE EXAMPLE 4

700 g of hardwood chip was packed in a 4-liter autoclave and digested for 25 minutes at 180° C. with the addition of 12% of sodium sulfite and 2% of sodium carbonate. The cooked chips were refined by a disc refinder to give a pulp in a 77% yield. The pulp was then beaten to a freeness of 450 ml and 1.5% of aluminum sulfate was added to adjust the pH value to 5.5. A hand-made paper sheet was made as Reference Example 4 from this pulp.

The paper sheets of Embodiment 7 and Reference Example 4 were subjected to an anti-rust test, the result of which is shown in Table 4 below.

TABLE 4

|  | Example 7 | Ref. Example 4 |
| --- | --- | --- |
| pulping method | sodium carbonate | neutral sulfite |
| paper-making method | neutral | acidic |
| rusting area (%) | 4 | 41 |

EXAMPLE 8

600 g of softwood chip was packed in a 5-liter autoclave and digested by the soda process. More specifically, the digesting was conducted with the addition of 18% of caustic soda for 2 hours at 170° C. to obtain a pulp of a kappa number of 51. This pulp was beaten to a freeness of 500 ml and, after adding 0.3% of alkyl ketene dimer and 0.6% of cation starch, a hand-made paper sheet of 80 g/m² was prepared at pH 6.8. Then, starch and sodium nitrite were applied by a Meyer bar at rates of 0.5 g/m² and 0.3 g/m², respectively, on the surface of the thus formed paper sheet. The paper sheet of Example 8 thus produced was subjected to the anti-rust test, the results of which are shown in Table 5.

EXAMPLE 9

The pulp obtained in Example 8 was beaten to a freeness of 450 ml and was supplied with 0.2% of rosin size, 0.3% of polyacrylic acid and 3.5% of aluminum sulfate to exhibit a pH value of 4.5. A hand-made paper sheet of 150 g/m² was made from this pulp. Then, starch and sodium nitrite were applied by a Meyer bar at rates of 0.5 g/m² and 0.3 g/m², respectively. The paper sheet of Example 9 thus produced was subjected to the anti-rust test the results of which are also in shown in Table 5.

EXAMPLE 10

With the addition of a kraft cooking liquor having 18% of activated alkali and a sulfur content of 25%, softwood chip was cooked for 2 hours at 170° C. to become a pulp having a kappa number of 50. The pulp was then beaten by a PFI mill to a freeness of 500 ml and, after addition of 0.2% of a petroleum resin cation size and 0.3% of polyamide polyamine cation polymer, a hand-made paper sheet of 80 g/m² was made at pH 7.4. Then, starch and sodium benzoate were applied by a Meyer bar at rates of 0.5 g/m² and 0.3 g/m², respectively, on the thus formed paper sheet. The paper sheet of Example 10 thus produced was then subjected to the anti-rust test, the result of which also are shown in Table 5.

EXAMPLE 11

With the addition of 13% of sodium sulfite and 3% of sodium carbonate, hardwood chip was digested for 40 minutes at 180° C. to obtain a pulp at 75% yield. The pulp was then beaten to a freeness of 450 ml and, after addition of 0.1% of alkyl ketene dimer and 0.5% of cation starch, a hand-made paper sheet of 150 g/m² was made from this pulp at pH 7.0. Then, starch and sodium nitrite were applied by a Meyer bar at rates of 0.3 g/m² and 0.2 g/m², respectively, on the thus formed paper sheet. The paper sheet of Example 11 thus produced was then subjected to the anti-rust test, the results of which also are shown in Table 5.

EXAMPLE 12

A pulp of a freeness of 430 ml was obtained b6 defibering waste corrugated boxes by means of a Tappi defibrator and then removing dust by means of a 12-cut flat screen. Then, the pH value was adjusted to 7.7 after addition of 0.2% of alkyl ketene dimer and 0.5% of cation starch, and a paper sheet of 150 g/m² was prepared from this slurry. Subsequently, PVA and sodium phosphate were added at rates of 0.3 g/cm², respectively, by means of a Meyer bar. The paper sheet of Example 12 thus produced was subjected to the anti-rust test, the results of which also are shown in Table 5.

REFERENCE EXAMPLE 5

A paper sheet of 150 g/m² was made at pH 4.5 by beating the pulp obtained in Example 11 to a freeness of 450 ml and then adding 0.3% of rosin size, 0.5% of polyacrylamide and 3.5% of aluminum sulfate. The paper sheet of Reference Example 5 thus formed was subjected to the anti-rust test, the results of which are also shown in Table 5.

REFERENCE EXAMPLE 6

A hand-made paper sheet of 170 g/m² was produced at pH 4.7, by adding 0.2% of rosin size, 0.3% of polyacrylamide of anion system and 3% of aluminum sulfate, to the pulp as obtained in Example 12. The paper sheet of Reference Example 6 thus prepared was subjected to an anti-rust test, the results of which also are shown in Table 5.

TABLE 5

|  | pulping method | paper making method | surface coating | rusting area (%) |
| --- | --- | --- | --- | --- |
| Example |  |  |  |  |
| 8 | soda process | neutral | sodium nitrite | 1 |
| 9 | " | acidic | " | 3 |
| 10 | kraft process | neutral | sodium benzoate | 5 |
| 11 | sulfite process | " | sodium nitrite | 11 |
| 12 | pulping of waste corrugated box | " | sodium phosphate | 4 |
| Ref. Example |  |  |  |  |
| 1 | kraft process | acidic | — | 30 |
| 5 | sulfite process | " | — | 47 |
| 6 | pulping of waste | " | — | 32 |

EXAMPLE 13

The pulp as used in Example 8 was beaten to a freeness of 500 ml and, after addition of 0.3% of alkyl ketene dimer and 0.6% of cation starch, a hand-made paper sheet of 80 g/m² was made from this pulp. The pH value was 6.8. The paper sheet of Embodiment 13 thus produced was subjected to the same anti-rust test as that mentioned before, the results of which are shown in Table 6.

EXAMPLE 14

The pulp obtained through the method of Example 13 was beaten to a freeness of 450 ml. Then, 0.2% of petroleum resin cation size and 0.3% of polyamide polyamine cation polymer were added to the beaten pulp. Then, a hand-made paper sheet was made from this pulp at pH 7. Subsequently, starch and sodium nitrite were applied by a Meyer bar at rates of 0.5 g/m² and 0.3 g/m², respectively. The paper sheet of Example 14 thus produced was then subjected to the anti-rust test, the results of which are also shown in Table 6.

EXAMPLE 15

The pulp used in Example 10 was beaten by a PFI mill to a freeness of 500 ml. Then, 0.2% of a petroleum resin cation size and 0.3% of polyamide polyamine cation polymer were added to the beaten pulp, and a hand-made paper sheet of 80 g/m² was made at pH 7.4. The thus formed paper sheet of Example 15 was subjected to the anti-rust test, the results of which also are shown in Table 6.

EXAMPLE 16

The pulp used in Example 11 was beaten to a freeness of 450 ml and, after addition of 0.1% of alkyl ketene dimer and 0.5% of cation starch to the beaten pulp, a hand-made sheet of 150 g/m² was made at pH 7.0. The paper sheet of Example 16 thus formed was subjected to an anti-rust test, the results of which also are shown in Table 6.

EXAMPLE 17

The same pulp as that used in Example 12 was used. After adding 0.2% of alkyl ketene dimer and 0.5% of cation starch to this pulp, the pH value was adjusted to 7.7 and a hand-made paper sheet of 150 g/m² was made from this pulp. The paper sheet of Example 17 thus formed was subjected to the anti-rust test, the results of which are also shown in Table 6.

TABLE 6

| | pulping method | paper making method | surface coating | rusting area % |
|---|---|---|---|---|
| Example | | | | |
| 13 | soda process | neutral | — | 3 |
| 14 | " | " | sodium nitrite | 1 |
| 15 | kraft process | " | — | 10 |
| 16 | sulfite process | " | — | 26 |
| 17 | pulping of waste corrugated box | " | — | 10 |
| Ref. Example | | | | |
| 1 | kraft process | acidic | — | 30 |
| 3 | sulfite process | " | — | 47 |
| 6 | pulping of waste corrugated box | " | — | 32 |

EXAMPLE 18

With the addition of 0.5% of acetic peracid, the pulp as used in Example 10 was held for 60 minutes at 40° C., and was beaten by a PFI mill to a freeness of 500 ml. Then, after adding 0.3% of rosin higher fatty acid polyamide and 0.5% of cation-denaturated starch, a hand-made paper sheet of 80 g/m² was made at pH 7.2. The paper sheet of Example 18 thus produced was subjected to the anti-rust test, the results of which are also shown in Table 7.

REFERENCE EXAMPLE 7

A sample paper sheet was made as Reference Example 7 by the same process as Example 18 except that the oxidation of pulp was omitted. The paper sheet of Reference Example 7 was subjected to the anti-rust test, the results of which are also shown in Table 7.

EXAMPLE 19

A paper sheet of Example 19 was prepared by applying, by means of a Meyer bar, PVA and sodium benzoate at rates of 0.3 g/m², respectively, to the hand-made sheet as obtained by the process of Example 18. This paper sheet was subjected to the anti-rust test, the results of which are also shown in Table 7.

REFERENCE EXAMPLE 8

A sample paper sheet was prepared as Reference Example 8 by the same process as Example 19 except that the oxidation of the pulp was omitted. The paper sheet of Reference Example 8 was subjected to the anti-rust test, the results of which also are shown in Table 7.

EXAMPLE 20

The pulp obtained through the process of Example 18 was beaten to a freeness of 500 ml and, after addition of 0.3% of rosin size, 0.5% of polyacrylamide of anion system and 3% of aluminum sulfate, a hand-made paper sheet of 80 g/m² was made at pH 4.8. This paper sheet of Example 20 was subjected to the anti-rust test, the results of which also are shown in Table 7.

REFERENCE EXAMPLE 9

A sample paper sheet was prepared as Reference Example 9, by the same process as Example 20 except that the oxidation of pulp was omitted. This paper sheet of Reference Example 9 was subjected to the anti-rust test, the result of which also is shown in Table 7.

EXAMPLE 21

The pulp used in Example 11 was defibrated by a disc refiner. Meanwhile, a solution was prepared by making 0.5 mole of acetic anhydride react with 1 mol of hydrogen peroxide at room temperature for 10 minutes. The thus prepared solution was added to the pulp at a rate of 0.5% on hydrogen peroxide basis, to oxidize the pulp for 30 minutes at 40° C.

After the oxidizing treatment, the pulp was beaten to a freeness of 450 ml and was supplied with 0.3% of alkenyl succinic anhydride and 0.5% of cation starch. Then, after adjustment of pH value of 7, a hand-made paper sheet of 150 g/m² was made from this pulp. The paper sheet of Embodiment 21 thus produced was subjected to an anti-rust test, the results of which are also shown in Table 7.

REFERENCE EXAMPLE 10

A sample paper sheet was prepared as Reference Example 10 by the same process as Example 21 except that the oxidizing of pulp was omitted. The paper sheet of Reference Example 10 was subjected to the anti-rust test, the results of which are also shown in Table 7.

EXAMPLE 22

With the addition of 0.7% of hydrogen peroxide, the pulp used in Embodiment 12 was oxidized for 2 hours at 50° C. After the oxidizing treatment, 0.3% of rosin size, 0.5% of polyacrylamide and 2.5% of aluminum sulfate were added to the oxidized pulp from which a hand-made paper sheet of 150 g/m² was made. Then, starch and sodium nitrite were applied by a Meyer bar to the sheet surface at rates of 0.5 g/m² and 0.3 g/m², respectively. The paper sheet of Example 22 thus formed was subjected to the anti-rust test, the results of which also are shown in Table 7.

REFERENCE EXAMPLE 11

A sample paper sheet was prepared as Reference Example 11 by the same process as Example 22 except that the oxidizing of the pulp was omitted. The paper sheet of Reference Example 11 thus formed was subjected to the anti-rust test, the results of which are also shown in Table 7.

was subjected to an anti-rust test conducted in the following manner. This test was also applied to the other Examples and Reference Examples which will be described later. Namely, the test was conducted employing square iron test pieces having a side length of 5 cm, cut out of an SPCC iron sheet. The test pieces were sandwiched between pairs of the respective paper sheets and were held for 1 month at 35° C. and 90% RH. Then, the ratio of the rusting area to the whole area of the test piece surface was measured and expressed in terms of %. The results of this test are shown in Table 8.

EXAMPLE 24

A sheet of 200 g/m² was made at pH 7.4 by heating the pulp used in Example 10 to a freeness of 500 ml by means of a PFI mill, and then adding 0.2% of petroleum cation size and 0.3% of polyamide polyamine cation polymer. Then, potassium sorbate, starch and sodium benzoate were applied by a Meyer bar to both surfaces of the thus produced sheet, at rates of 0.1 g/cm², 0.25 g/cm² and 0.15 g /cm². The paper sheet of Example 24 thus formed was subjected to the anti-rust test, the results of which are also is shown in Table 8.

EXAMPLE 25

A sheet of 150 g/m² was produced at pH 7.0, by beating the pulp used in Example 11 to a freeness of 450 ml and then adding 0.1% of alkyl ketene dimer and 0.5% cation starch. Then, p-oxybenzoic acid ethylester (dissolved in 0.1% NaOH solution) was applied to both surfaces of the thus obtained sheet at a rate of 0.01 g/m². Subsequently, the surfaces were coated with 0.3 g/m² of PVA and 0.3 g/m² of sodium phosphate. The paper sheet of Embodiment 25 thus produced was subjected to the anti-rust test, the results of which are also shown in Table 8.

TABLE 7

| | pulping method | oxidizing method | paper making method | surface coating | rusting area (%) |
|---|---|---|---|---|---|
| Example | | | | | |
| 18 | kraft process | acetic peracid | neutral | — | 6 |
| 19 | " | " | " | sodium benzoate | 3 |
| 20 | " | " | acidic | — | 14 |
| 21 | sulfite process | hydrogen peroxide acetic anhydride | neutral | — | 12 |
| 22 | pulping of waste corrugated box | hydrogen peroxide | acidic | sodium nitrite | 7 |
| Ref. Example | | | | | |
| 7 | kraft process | — | neutral | — | 12 |
| 8 | " | — | " | sodium benzoate | 5 |
| 9 | " | — | acidic | — | 30 |
| 10 | sulfite process | — | neutral | — | 30 |
| 11 | pulping of waste corrugated box | — | acidic | sodium nitrite | 19 |

EXAMPLE 23

The pulp used in Example 8 was beaten to a freeness of 500 ml. After the addition of 0.3% of alkyl ketene dimer and 0.6% of cation starch, a paper sheet of 200 g/m² was made at pH 6.8. Then, by means of a Meyer bar, dehydroacetic acid (dissolved in 0.1% caustic soda solution), starch and sodium nitrite were applied to both surfaces of the thus formed sheet, at rates of 0.05 g/m², 0.25 g/m² and 0.15 g/m². The paper sheet thus formed

EXAMPLE 26

A corrugated sheet was produced by using, as the liners, the sheet before application of chemicals in Example 23 and the sheet after application of chemicals in Example 23, while employing, as the corrugate medium, a sheet of freeness of 450 ml from the pulp as prepared in Example 3. These three layers were bonded together by a Steinhall type starch paste. Then, the anti-rust test was conducted by placing the iron test piece in contact with the liner coated with the chemicals. The test was made in this manner also for corrugated sheet of other Examples which will be described later. The results of this test are also shown in Table 8.

EXAMPLE 27

A corrugated sheet was produced by using, as liners, the sheets obtained before and after the application of chemicals in Example 24, and employing, as the core, a sheet of a freeness of 450 ml produced from the pulp produced in Example 11, and bonding these sheets together by means of a Steinhall-type starch paste. This corrugated sheet was subjected to the anti-rust test, the results of which are also shown in Table 8.

EXAMPLE 28

PVA and sodium nitrite were applied to the surface of the sheet obtained in Embodiment 1 before the application of chemicals at rates of 0.3 g/m$^2$, respectively. A corrugated sheet was produced using this sheet and the sheet before the application of chemicals as the liners, while employing, as the corrugate medium, a sheet of freeness of 450 ml produced from the pulp obtained in Example 11, by bonding these sheets together with a starch adhesive in which high amylose starch with addition of 0.3% of potassium sorbate and anti-hydration agent were added. This corrugated sheet was subjected to the anti-rust test, the results of which are shown in Table 8 below.

EXAMPLE 29

A hand-made paper sheet of 100 g/m$^2$ was made by adding 0.2% of alkyl ketene dimer and 0.5% of cation starch to the pulp as used in Example 12 and adjusting the pH value to 7.7. To both surfaces of the thus formed sheets, there were applied by a Meyer bar p-oxybenzoic acid ethylester (dissolved in 0.1% NaOH solution), starch and sodium phosphate at rates of 0.02 g/m$^2$, 0.25 g/m$^2$ and 0.15 g/m$^2$. This sheet was subjected to the anti-rust test, the results of which are also shown in Table 8.

EXAMPLE 23A

A sheet similar to that of Example 23 was produced without using the dehydroacetic acid as the coating chemical, and was subjected to the anti-rust test.

REFERENCE EXAMPLE 13

As Reference Example 13, a sheet similar to that of Example 24 was produced without using the potassium sorbate as coating chemical, and was subjected to the anti-rust test.

REFERENCE EXAMPLE 14

As Reference Example 14, a corrugated sheet was produced by using, as liners, the sheet of Reference Example 12 and the sheet before application of chemicals in Example 23, while employing a corrugate medium consisting of a sheet of a freeness of 450 ml prepared from the pulp of Example 25, and bonding these sheets together by a Steinhall-type starch paste. The thus formed corrugated sheet was subjected to the anti-rust test.

REFERENCE EXAMPLE 15

As Reference Example 15, a corrugated sheet was produced by using, as liners, the sheet formed in Reference Example 13 and the sheet before the application of chemicals in Example 24, while employing a corrugate medium consisting of a sheet of a freeness of 450 ml prepared from the pulp formed in Example 11, and bonding these sheets together by a Steinhall-type starch paste. This corrugated sheet was subjected to the anti-rust test.

REFERENCE EXAMPLE 16

As Reference Example 16, a sheet similar to that of Embodiment 29 was produced without using the p-oxybenzoic acid ethylester as the coating chemical, and was subjected to the anti-rust test.

TABLE 8

| | pulping method | test paper | anti-tunge agent | rusting area (%) |
|---|---|---|---|---|
| Example | | | | |
| 23 | soda process | paper | dehydroacetic acid | 2 |
| 24 | kraft process | " | potassium sorbate | 5 |
| 25 | sulfite process | " | p-oxybenzoic acid ethylester | 15 |
| 26 | (liner) soda process | corrugated sheet | dehydroacetic acid | 3 |
| 27 | (liner) kraft process | corrugated sheet | potassium sorbate | 8 |
| 28 | (liner) soda process | corrugated sheet | " (added to adhesive) | 6 |
| 29 | pulping of waste corrugated box | paper | p-oxybenzoic acid ethylester | 5 |
| 23A | soda process | " | — | 3 |
| 13 | kraft process | " | — | 7 |
| Ref. Example | | | | |
| 14 | (liner) soda process | corrugated sheet | — | 45 |
| 15 | (liner) kraft process | corrugated sheet | — | 70 |
| 16 | pulping of waste corrugated box | paper | — | 18 |

From Tables showing the properties of the paper sheets and corrugated sheets, it will be fully understood that the packaging paper and packaging material of the invention exhibit superior anti-rust effect when used in packaging of metallic materials.

What is claimed is:

1. A method for producing a packaging paper for packaging metallic materials comprising the steps of:
   (A) pulping a lignocellulose material by a soda cooking liquor containing no sulfur comound having at least one quinone added thereto in an amount of 0.02 to 0.2 wt. % based on the weight of the oven-dry lignocellulose material to prepare a sulfur free pulp;
   (B) making a paper sheet from said pulp in a neutral pH range between 6 and 8; and
   (C) applying an agent having a rust-prevention effect to a surface of said paper sheet in an amount sufficient to prevent rusting of the metallic materials, said agent being selected from the group consisting of sodium benzoate, sodium nitrite, and sodium phosphate.

2. A packaging paper for packaging metallic materials, produced by the method according to claim 1.

3. A method for producing a packaging material for packaging metallic materials comprising the steps of:
   (A) pulping a lignocellulose material by a soda cooking liquor containing no sulfur compound having at least one quinone added thereto in an amount of 0.02 to 0.2 wt.% based on the weight of the oven-dry lignocellulose material to prepare a sulfur free pulp;
   (B) making a paper sheet from said pulp in a neutral pH range between 6 and 8; and
   (C) applying to a surface of at least one of said paper sheets an agent having a rust prevention effect in an amount sufficient to prevent rusting of the metallic materials and a sterilizer in a ratio of 0.1 to 3 wt.% based on the weight of said paper sheet, said agent being selected from the group consisting of sodium benzoate, sodium nitrite, and sodium phosphate, and said sterilizer being selected from the group consisting of dehydroacetic acid, ethyl ester of p-oxybenzoic acid, and potassium sorbate.

4. A method for producing a packaging material for packaging metallic materials according to claim 3, wherein at least two of said paper sheets are bonded by an adhesive containing said agent and said sterilizer.

5. A packaging material for packaging metallic materials, produced by the method according to any one of claims 3 and 4.

6. A packaging material according to claim 5, wherein said packaging material is a container.

* * * * *